US005680697A

United States Patent [19]

Bever

[11] Patent Number: 5,680,697

[45] Date of Patent: Oct. 28, 1997

[54] SPARK PLUG TERMINAL REMOVAL TOOL

[76] Inventor: Frederick Leo Bever, 828 #2 Decatur St., Sandusky, Ohio 44870

[21] Appl. No.: 720,440

[22] Filed: Sep. 30, 1996

[51] Int. Cl.[6] .............................. B25B 27/14; B23P 19/04

[52] U.S. Cl. .............................. 29/764; 29/268; 29/280; 29/705; 7/107; 81/426.5

[58] Field of Search .............................. 29/268, 280, 764, 29/720, 705; 7/107; 81/125, 424.5, 426.5; D8/52, 58; 72/409.06, 409.14

[56] References Cited

U.S. PATENT DOCUMENTS

| | | | |
|---|---|---|---|
| D. 322,920 | 1/1992 | Wolfe | D8/52 |
| 3,599,309 | 8/1971 | Mulligan | 29/764 |
| 3,673,384 | 6/1972 | Burman et al. | 29/764 X |
| 4,125,938 | 11/1978 | Clark | 29/268 X |
| 4,202,088 | 5/1980 | Hansen | 29/764 X |
| 4,425,697 | 1/1984 | Simmons | 29/280 |
| 4,757,588 | 7/1988 | Churchich | 29/268 X |
| 5,253,408 | 10/1993 | Wright | 29/280 |
| 5,537,727 | 7/1996 | Mayer | 81/424.5 X |

FOREIGN PATENT DOCUMENTS

| | | | |
|---|---|---|---|
| 196495 | 10/1986 | European Pat. Off. | 7/107 |
| 3-79280 | 4/1991 | Japan | 29/764 |
| 240862 | 1/1946 | Switzerland | 29/268 |

*Primary Examiner*—Peter Vo
*Attorney, Agent, or Firm*—David L. Volk

[57] ABSTRACT

A plier portion includes two arms connected to each other in a crossing manner, each arm having a handle and a grasping end. Removeable tips are attachable to the grasping ends. An uninsulated grounding cable connects the plier portion to a ground connection device in a visually verifiable manner.

11 Claims, 4 Drawing Sheets

SPARK PLUG TERMINAL REMOVAL TOOL

BACKGROUND OF THE INVENTION

1. Field of the Invention

The present invention relates to hand tools, specifically to a hand tool for removal of spark plug terminals to test engine spark.

2. Description of the Related Art

When a mechanic or car owner tests for the cause of engine trouble, it is often necessary to use a spark plug terminal removal tool to remove a spark plug terminal from a distributor or engine cylinder and to visually check the spark arcing from the spark plug terminal to the spark plug.

Spark plug terminal removal tools available today consist of steel pliers with an insulated ground wire extending from the handles, and an insulated grounding clip at the distal end of the ground wire.

Spark plug terminal removal tools require a secure grounding system to avoid potentially fatal, high voltage shock. The grounding system, in addition to being secure, should be visually verifiable. An improved spark plug terminal removal tool would include a more secure grounding system compared to the prior art, and the grounding system would be more readily and completely visually verified.

Because spark plug terminals exist in a variety of shapes and sizes, an improved tool would have interchangeable tips to firmly grasp and remove all types of spark plug terminals.

SUMMARY OF THE INVENTION

The spark plug terminal removal tool of the present invention includes a plier portion, an uninsulated grounding cable, and a ground connection device. The plier portion includes two arms connected to each other in a crossing manner, each arm having a handle and a grasping end. Removable tips are attachable to the grasping ends. The grounding cable connects the plier portion to the ground connection device in a visually verifiable manner.

Accordingly, several objects and advantages of the present invention are:

a. to provide a spark plug terminal removal tool having a secure grounding system;

b. to provide a spark plug terminal removal tool having a visually verifiable grounding system; and c. to provide a spark plug terminal removal tool having interchangeable tips to permit firm and secure grasping and removal of spark plug terminals of various sizes and shapes.

Still further objects and advantages will become apparent from the ensuing description and drawings.

DETAILED DESCRIPTION

Figure 1:
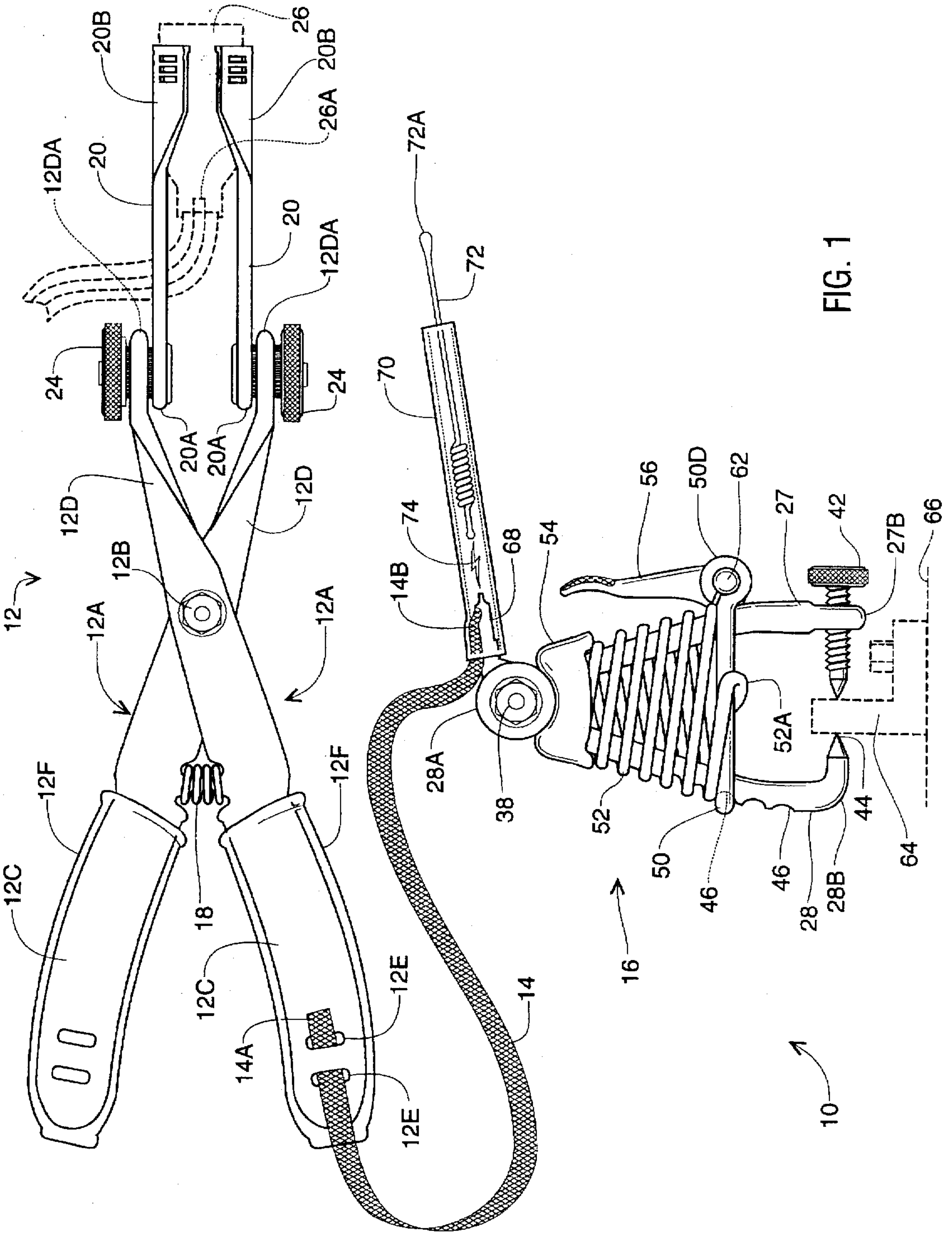
FIG. 1 is an elevational view of a spark plug terminal removal tool.

FIG. 1 is an elevational view of a spark plug terminal removal tool 10 including a plier portion 12, a grounding cable 14, and a ground connection device 16. The plier portion 12 comprises two arms 12A connected to each other in a crossing manner by a pivot pin 12B. The arms 12A are configured to pivot with respect to each other about the pivot pin 12B in the same manner as conventional pliers. Each arm 12A includes a handle 12C on one side of the pivot pin 12B, and a grasping end 12D on the other side of the pivot pin 12B. A spring 18 is connected between the handles 12C, arranged to urge the handles 12C apart from each other.

The grounding cable 14 is attached at a first end 14A thereof to one of the handles 12C and at a second end 14B to the ground connection device 16. The cable 14 is in the form of a braided metal sleeve. A braided metal sleeve is used because the multitude of braided strands provide a very strong and reliable structure. Even if several of the strands break, the ground connection will be maintained through the remaining strands.

At least one of the handles 12C includes structure forming two slots 12E there-through, and a substantially transparent or transluscent handle cover 12F fitted snugly thereover. The slots 12E are positioned adjacent each other. The first end 14A of the grounding cable 14 is inserted through one of the slots 12E, and is returned back through the other slot 12E. The grounding cable 14 is securely captured within the slots 12E and between the handle 12C and the handle cover 12F. The connection of the grounding cable 14 to the handle 12 is visually verifiable through the transparent or transluscent handle cover 12F, thereby increasing the safety of the present invention.

The ground connection device 16 is configured to be attached to a ground source 64. In FIGS. 1 and **4*b*, the ground source 64 is an angle connected to an engine head 66**. This is shown for purposes of illustration; any reliable ground source may be used.

An arm 68 extends outwardly from the ground connection device 16. A substantially transparent or transluscent tube 70 fits snugly over the arm 68, capturing the second end 14B of the grounding cable 14 between the arm 68 and the tube 70. The tube 70 may be vinyl or other suitable material. The connection between the grounding cable 14 and the arm 68 is visually verifiable through the transparent or transluscent tube 70, thereby increasing the safety of the present invention.

A wire 72 is configured to slidably fit within the tube 70. The wire 72 may be slid longitudinally with respect to the tube 70 to adjust the distance between the arm 68 and the wire 72. A spark 74 between the arm 68 and the wire 72 may be viewed through the tube 70 for diagnostic purposes, when the spark plug terminal boot 26 is removed from a cylinder of an engine (not shown), and the spark plug terminal boot 26 is placed over the free end 72A of the wire 72 until a terminal wire 26A within the terminal boot 26 contacts the free end 72A of the wire 72 with the engine (not shown) running.

A removable tip 20 is attached to a distal end 12DA of each grasping end 12D. Each removable tip 20 includes a first tip end 20A and a second tip end 20B. The second tip end 20B of each removable tip 20 is configured such that the spark plug terminal boot 26 can be snugly grasped between each of the second tip ends 20B.

Figure 2:
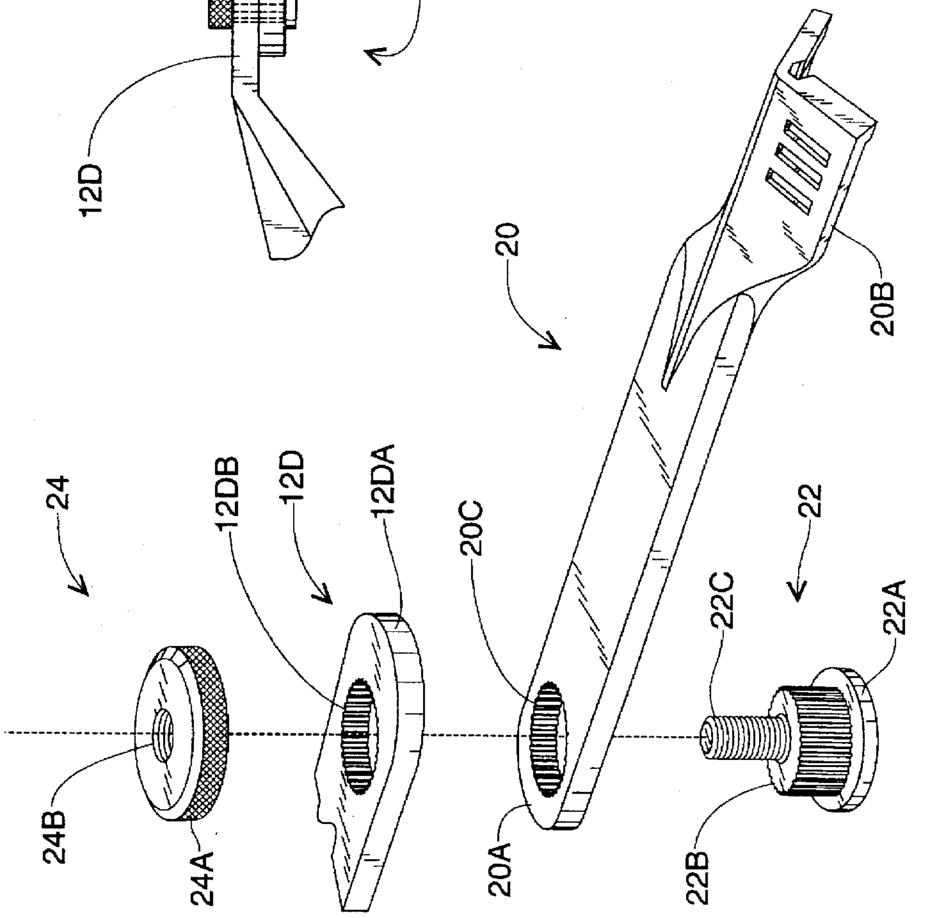
FIG. 2 is an exploded partial perspective view of the tool, showing the connection of the removable tip to the distal end of the grasping end.

FIG. 2 is a partial perspective view of the spark plug terminal removal tool 10, showing the connection of the removable tip 20 to the distal end 12DA of the grasping end 12D, in exploded view. The removable tip 20 has structure forming a splined circular first aperture 20C there-through, positioned near the first tip end 20A of the removable tip 20.

The grasping end 12D has structure forming a splined circular second aperture 12DB there-through, positioned near the distal end 12DA of the grasping end 12D. Each of the first and second apertures 20C, 12DB is evenly splined along its inward facing circumference.

A splined shoulder stud 22 includes a head 22A, an evenly splined cylindrical shoulder 22B connected to the head 22A, and a threaded shaft 22C connected to the shoulder 22B. The stud 22, first aperture 20C, and second aperture 12DB are configured such that the shoulder 22B may be fittingly engaged simultaneously within the first and second apertures 20C, 12DB when the stud 22 is inserted there-through.

A thumb nut 24 includes a knurled circumferential surface 24A to facilitate manual turning thereof. The thumb nut 24 includes structure forming a threaded central aperture 24B there-through. The central aperture 24B is configured to threadedly engage the shaft 22C.

The removable tip 20 is attached to the grasping end 12D of the arm 12A by lining up the first and second apertures 20C, 12DB and inserting the stud 22 there-through to engage the first and second apertures 20C, 12DB.

Figure 3:
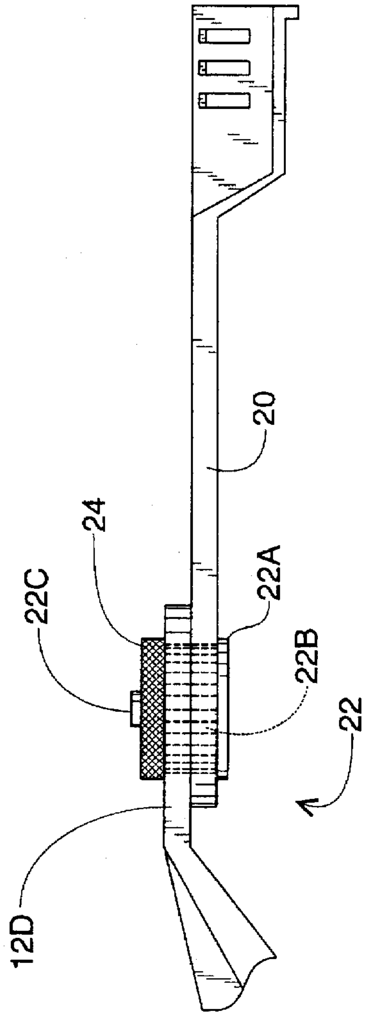
FIG. 3 is an enlarged elevational view of the removable tip attached to the grasping end.

As shown in FIG. 3, which is an enlarged perspective view of the removable tip 20 attached to the grasping end 12D, the shoulder 22B terminates short of passing completely through the grasping end 12D. This allows the thumb nut 24 to be tightened against the grasping end 12D, thereby securing the removable tip 20 to the grasping end 12D. Because the shoulder 22B, first aperture 20C, and second aperture 12DB are each evenly splined, the removable tip 20 may be connected to the grasping end 12D at a multitude of angles with respect there-to.

Figure 4A:
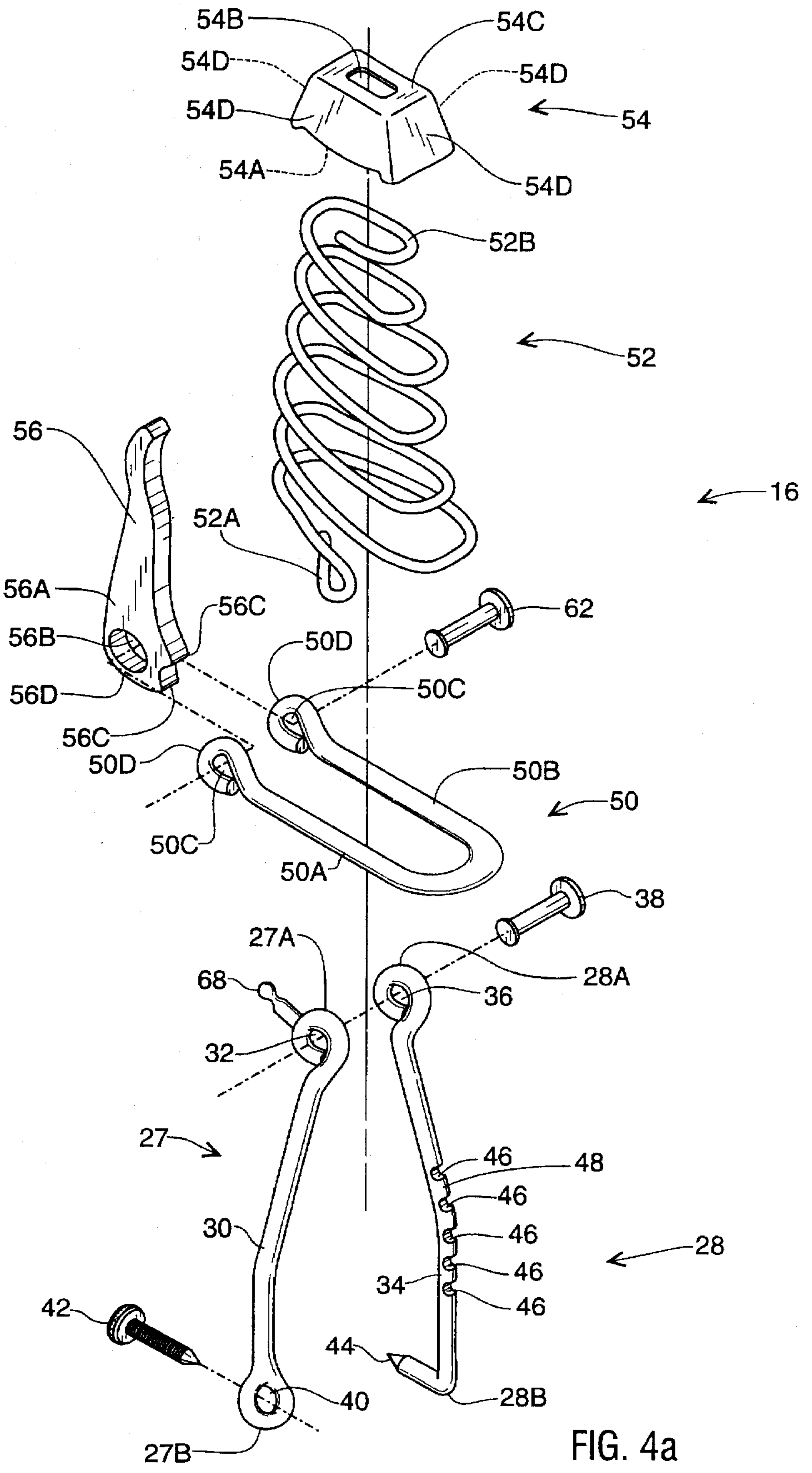
FIG. 4*a* is an exploded perspective view of the ground connection device.

FIG. 4*a* is an exploded perspective view of the ground connection device 16. Referring to FIGS. 1 and 4*a*, the ground connection device 16 include a first leg 27 and a second leg 28. The first leg 27 comprises a substantially elongated first body 30 which bends to form a first eye 32 at a first leg first end 27A. The arm 68 depends outwardly from the first leg 27 near the first leg first end 27A.

The second leg 28 comprises a substantially elongated second body 34 which bends to form a second eye 36 at a second leg first end 28A. A first pin 38 inserted through the first and second eyes 32, 36 pivotally connects the first and second legs 27, 28 to each other.

The first body 30 of the first leg 27 is configured to form a threaded aperture 40 at a first leg second end 27B. A thumb screw 42 is configured to threadedly engage the threaded aperture 40. The second body 34 of the second leg 28 is bent near a second leg second end 28B in the direction of the threaded aperture 40, and tapers to a point 44.

The second body 34 of the second leg 28 includes structure forming notches 46 on an outward facing surface 48 thereof.

A substantially U-shaped shackle 50 includes a first shackle leg 50A and a second shackle leg 50B. The shackle 50 bends to form a shackle eye 50C at each shackle distal end 50D. The first and second legs 27, 28 are movably captured between the first and second shackle legs 50A, 50B.

The first and second legs 27, 28 are also movably captured within a tapered spring 52. The tapered spring 52 is disposed between the shackle 50 and the structure forming the first and second eyes 32, 36. A first spring end 52A of the tapered spring 52 is configured to securely grasp the shackle 50.

A collar 54 is substantially box-shaped, and comprises four sides 54D extending from each edge of a top surface 54C at an obtuse angle thereto. The collar 54 includes structure forming an open bottom 54A and a collar aperture 54B through the top surface 54C of the collar 54. The top surface 54C of the collar 54 is positioned between a narrow end 52B of the tapered spring and the structure forming the first and second eyes 32, 36. A narrow end 52B of the tapered spring 52 fits inside the collar 54 through the open bottom 54A.

The collar aperture 54B is configured such that the collar 54 is unable to slide over the structure forming the first and second eyes 32, 36. Thus, the collar 54 acts to keep the tapered spring 52 from slipping off of the first and second legs 27, 28.

A lever 56 includes a cam-shaped end 56A. The cam-shaped end 56A includes structure forming a lever eye 56B there-through. A second pin 62 extends through the shackle eyes 50C and the lever eye 56B, thereby pivotally connecting the lever 56 to the shackle 50.

Figure 4B:
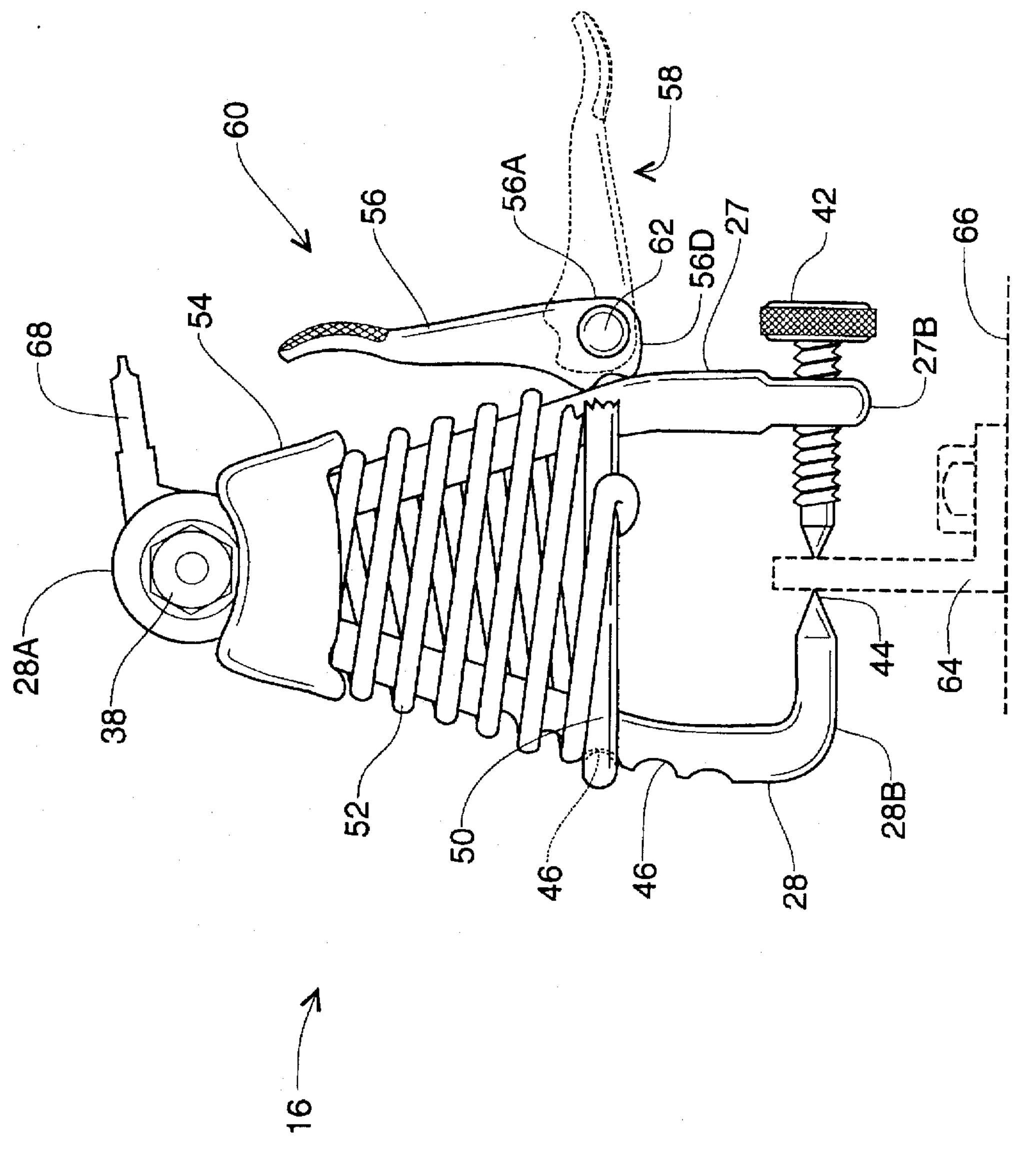
FIG. 4*b* is an elevational view of the ground connection device.

FIG. 4*b* is an elevational view of the ground connection device 16. Referring to FIGS. 4*a* and 4*b*, the cam-shaped end 56A includes two stop-hubs 56C protruding there-from. The cam-shaped end 56A is configured such that the lever 56 may be moved from an open position 58 wherein a distal edge 56D of the lever 56 faces the first leg 27 to a closed position 60 wherein the ends of the stop nubs 56C rest simultaneously against the first leg 27. The distance between the distal edge 56D and the second pin 62 is less than the distance between the ends of the stop nubs 56C and the second pin 62. Thus when in the closed position 60, the lever 56 and the shackle 50 limit the outward travel of the first and second legs 27, 28 more than when in the open position 58.

To connect the ground connection device 16 to the ground source 64, first the thumb screw 42 is engaged in the threaded aperture 40 about half of its available length of travel. Then the lever 56 is placed in the open position 58 and the shackle 50 is pulled against the tapered spring 52, compressing the tapered spring 52 and permitting the first and second legs 27, 28 to move apart from each other. The grounding device 16 is then placed over the ground source 64 and the shackle 50 is released. This causes the tapered spring 52 to urge the shackle 50 toward the first and second leg second ends 27B, 28B. The shackle 50 is allowed to engage within a notch 46, and the lever 56 is moved to the closed position 60. The thumb screw 42 is then further tightened against the ground source. The lever 56 and the shackle 50 prevent outward movement of the first and second legs 27, 28, thereby maintaining a tight connection between the ground connection device 16 and the ground source 64.

Thus the present invention provides a secure grounding system which includes: the ground connection device 16 configured to securely grasp the ground source 64; the braided grounding cable 14; and the firm connections between the grounding cable 14 and the handle 12C, and between the grounding cable 14 and the arm 68 of the ground connection device 16.

The grounding system of the present invention is visually verifiable because the grounding cable 14 is uninsulated, the connection to the handle 12C may be seen through the handle cover 12F, and the connection to the arm 68 of the ground connection device 16 may be seen through the tube 70.

The present invention may be used to firmly grasp a wide variety of differently shaped spark plug terminal boots 26, because the removable tips 20 are interchangeable with tips of different configurations. The present invention may be used in a wide variety of working conditions on different makes of vehicles with different placements of spark plugs, because the present invention includes structure which allows the removable tips 20 to be attached to the grasping ends 12D of the arms 12A at a wide variety of angles with respect thereto.

The spark plug terminal removal tool 10 is made of conductive materials such as steel alloy, except for the handle covers 12F and the tube 70, which may be manufactured of vinyl or similar material.

The foregoing description is included to describe embodiments of the present invention which include the preferred embodiment, and is not meant to limit the scope of the invention. From the foregoing description, many variations will be apparent to those skilled in the art that would be encompassed by the spirit and scope of the invention. The scope of the invention is to be limited only by the following claims and their legal equivalents.

The invention claimed is:

1. A spark plug terminal removal tool for removing a terminal boot from a spark plug comprising:

a. a plier portion having two arms connected to each other in a crossing manner by a pivoting means, each arm having a handle on one side of the pivoting means and a grasping end on another side of the pivoting means;

b. a ground connection device;

c. a grounding cable having a first end and a second end;

d. a handle connection means for providing a visually exposed connection between the first end of the grounding cable and the handle; and e. a ground connection device connection means for providing a visually exposed connection between the second end of the grounding cable and the ground connection device.

2. The spark plug terminal removal tool of claim 1, wherein each of the grasping ends includes a grasping tip removably attached thereto.

3. The spark plug terminal removal tool of claim 2, wherein each of the removable tips includes a first tip end and a second tip end, the second tip end of each of the removable tips is adapted to snugly grasp a spark plug terminal boot between each of the second tip ends, the removable tip includes an evenly splined circular first aperture therethrough, the first aperture is positioned near the first tip end, the grasping end includes structure forming an evenly splined circular second aperture therethrough near a distal end thereof, an evenly splined shoulder stud is configured to fittingly engage the first and second apertures simultaneously, a securing means is provided for engaging the shoulder stud and securing the removable tip to the grapsing end, and the first and second apertures and the shoulder stud are configured such that the removable tip may be connected to the grasping end at a multitude of angles with respect thereto.

4. The spark plug terminal removal tool of claim 1, wherein the handle connection means comprises structure forming a first slot and a second slot through the handle, the first and second slots are positioned adjacent each other, the first end of the grounding cable is inserted through the first slot and is returned back through the second slot, and a handle cover is fitted snugly over the handle, capturing the grounding cable between the handle and the handle cover.

5. The spark plug terminal removal tool of claim 4, wherein the handle cover includes a substantially transparent portion through which the grounding cable and the slots can be viewed.

6. The spark plug terminal removal tool of claim 4, wherein the handle cover includes a substantially transluscent portion through which the grounding cable and the slots can be viewed.

7. The spark plug terminal removal tool of claim 1, wherein the ground connection device connection means comprises a covering means which captures the grounding cable between the ground connection device and the covering means.

8. The spark plug terminal removal tool of claim 7, wherein the covering means includes a substantially transparent portion through which the grounding cable can be viewed.

9. The spark plug terminal removal tool of claim 7, wherein the covering means includes a substantially transluscent portion through which the grounding cable can be viewed.

10. The spark plug terminal removal tool of claim 1, wherein the ground connection device comprises:

a. a first leg and a second leg pivotally connected to each other at a first leg first end and a second leg first end;

b. the first leg including a first pinching means at a first leg second end;

c. the second leg including a second pinching means at a second leg second end;

d. a shackle configured to moveably capture the first and second legs therein;

e. a tapered spring disposed between the shackle and the first and second leg first ends and capturing the first and second legs therein;

f. a restraining means for preventing the tapered spring from slipping off of the first and second legs;

g. a lever pivotally connected to the shackle at a cam-shaped end thereof; and h. structure forming engaging means in the second leg for engaging the shackle.

11. The spark plug terminal removal tool of claim 1, wherein the grounding cable is uninsulated.

* * * * *